CRITICAL TEMPERATURE THERMISTOR RELAXATION OSCILLATOR

Filed Aug. 21, 1964 3 Sheets-Sheet 1

INVENTOR.
Hisao Futaki
Kazutoshi Ikegami
BY
Wierstein & Wierstein

CRITICAL TEMPERATURE THERMISTOR RELAXATION OSCILLATOR

Filed Aug. 21, 1964 3 Sheets-Sheet 2

INVENTOR.
Hisao Futaki
Kazutoshi Ikegami

BY

Mesten & Mesten

June 27, 1967 HISAO FUTAKI ETAL 3,328,722

CRITICAL TEMPERATURE THERMISTOR RELAXATION OSCILLATOR

Filed Aug. 21, 1964 3 Sheets-Sheet 3

INVENTOR.
Hisao Futaki
Kazutoshi Ikegami

BY

Wenderoth & Wenderoth

# United States Patent Office 3,328,722

Patented June 27, 1967

3,328,722

CRITICAL TEMPERATURE THERMISTOR RELAXATION OSCILLATOR

Hisao Futaki, Musashino-shi, and Kazutoshi Ikegami, Kokubunji-machi, Tokyo-to, Japan, assignors to Kabushiki Kaisha Hitachi Seisakusho, Tokyo-to, Japan, a joint-stock company of Japan Filed Aug. 21, 1964, Ser. No. 391,129

Claims priority, application Japan, Aug. 22, 1963, 38/43,825; Feb. 19, 1964, 39/8,657; Apr. 1, 1964, 39/18,025, 39/18,026

6 Claims. (Cl. 331—71)

This invention relates to new construction of and circuit arrangement for a thermistor element which has the characteristic whereby its electrical resistance varies abruptly within a specified temperature range and is suitable for high-frequency oscillation or switching.

It is an object of the present invention to provide a new thermistor element of the above stated character having extreme miniature size, high response, high mechanical strength, long life, adaptability to mass production, whereby the manufacturing cost can be reduced, and applicability to a large number of practical and effective uses.

It is another object to provide circuit arrangements for utilization of the above stated thermistor element, said circuit arrangements being extremely simple and stable in operation.

The nature, principle, and utility of the invention will be best understood by reference to the following description taken in conjunction with the accompanying drawings in which like parts are designated by like reference characters, and in which.

Figure 5A:
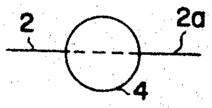
PRIOR ART FIG. 5a
Figure 5B:
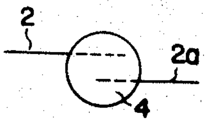
Figure 5C:
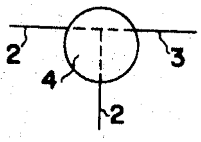
Figure 8:
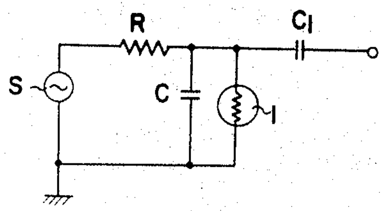
Figure 9:
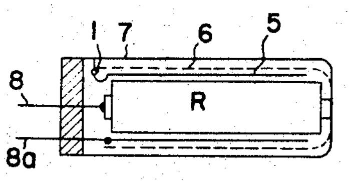
Figure 10:
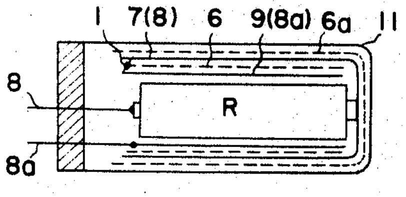
Figure 11:
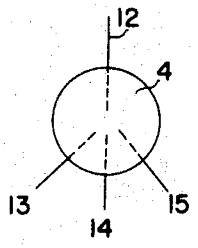
Figures 12, 13, 14, 15:
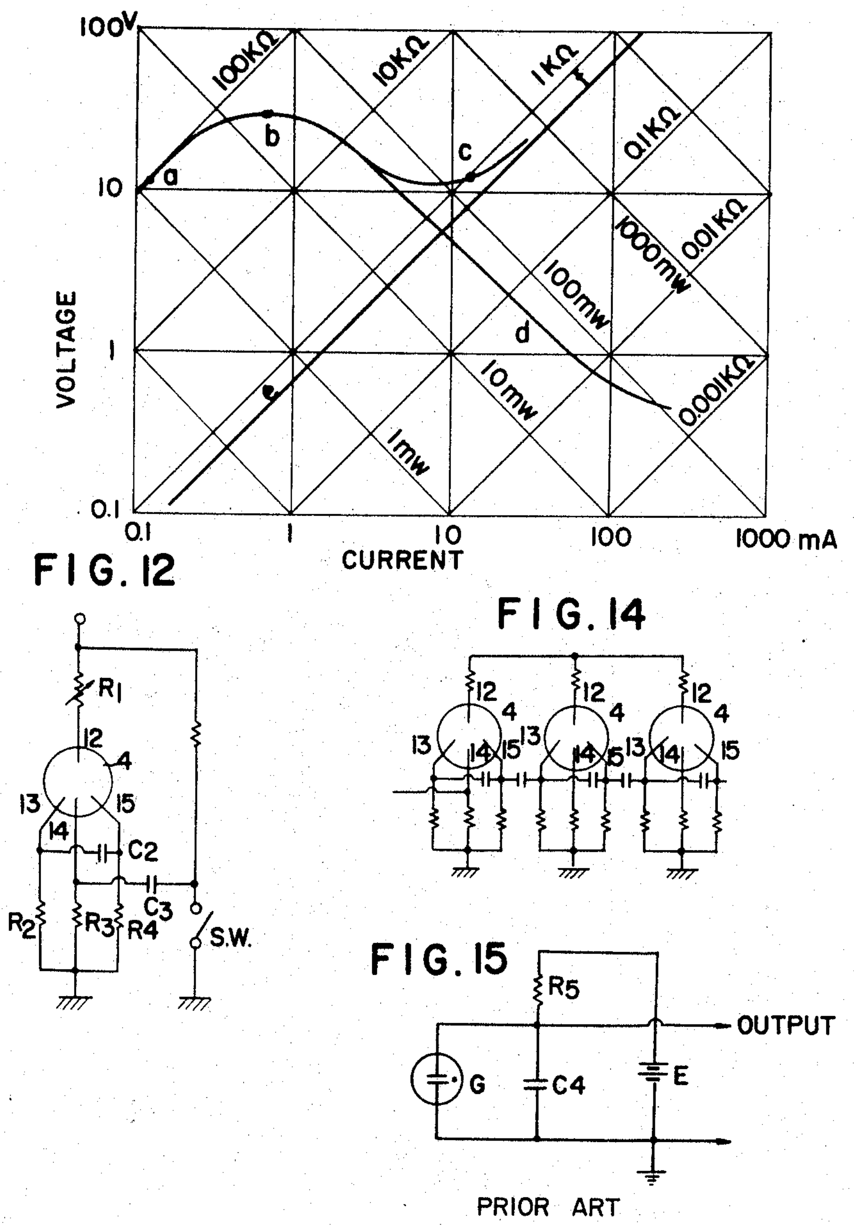

FIGS. 5 (*a*), (*b*), (*c*) and 6 (*a*), (*b*) are simplified diagrams indicating the essential construction of various embodiments of the thermistor element according to the invention;

FIGS. 7 (*a*), (*b*), (*c*) and (*d*) show oscillograms of oscillation in the case of an oscillator according to the invention;

FIG. 8 is a circuit diagram showing a pulse generator in which an oscillator according to the invention is used;

FIGS. 9 and 10 are simplified diagrams respectively indicating the essential construction of oscillators formed by the thermistor of the invention;

FIG. 11 is a simplifiied diagram indicating the essential construction of a thermistor element of another form suitable for use according to the invention;

FIG. 12 is a circuit diagram showing a flip-flop circuit wherein a critical temperature thermistor embodying the invention is used;

FIG. 13 is a graphical representation indicating the voltage versus current characteristic of a thermistor element, and presented for the purpose of description of the flip-flop circuit shown in FIG. 12;

FIG. 14 is a circuit diagram showing a circuit formed by the combination of a plurality of circuits each embodying the invention; and FIG. 15 is a circuit diagram of a sweep oscillator of known arrangement and composition.

As conductive to a full appreciation of the utility of the present invention, the following brief consideration of the prior art is believed to be useful.

Figure 1:
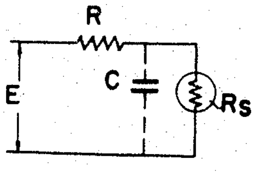
FIGS. 1 and 2 are circuit diagrams respectively showing examples of oscillation circuits wherein thermistors are used.

Heretofore, in the conventional oscillator in which a thermistor such as illustrated in FIG. 1 is used, the fact that the thermal capacity of the thermistor functions equivalently as an inductance is utilized in all cases. Accordingly, the frequency range thereof has been limited to that of approximately from 0.01 to 10 c./s., and, accordingly, direct current has been used also for bias.

Figure 3:
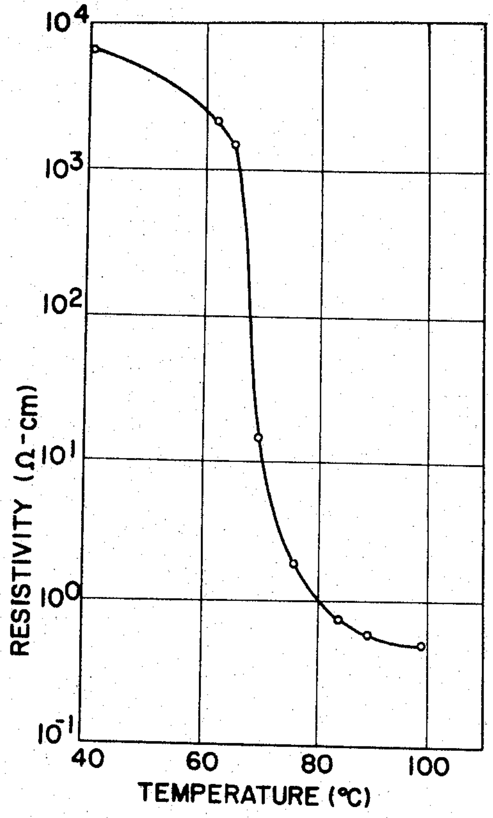
FIG. 3 is a graphical representation indicating the resistivity versus temperature characteristic of a critical temperature thermistor.

In addition to ordinary thermistors such as those used in oscillators of the above mentioned character, there are so-called critical temperature thermistors fabricated from an oxide semiconductor produced from a mixture of vanadium oxide as its principal constituent and an added substance such as a basic metallic oxide or an acidic oxide or fabricated from a sulfide semiconductor of the silver sulfide, copper sulfide system. Such a critical temperature thermistor has the characteristic of abruptly varying the resistance value in a certain temperature range as indicated in FIG. 3. When such a critical temperature thermistor is used in place of an ordinary thermistor, its electrical resistance varies widely by 3 to 4 digits in the critical temperature region, and its current-voltage characteristic approaches that of a full negative resistance. From this character of the critical temperature thermistor, it is known that this thermistor oscillates with higher stability than an ordinary thermistor.

However, the oscillation frequency in this case is low, being of the same order as that in the case of an ordinary thermistor. Furthermore, when a critical temperature thermistor is used, its conductivity abruptly rises at the critical temperature point. We have found that, therefore, when an oscillation circuit wherein, as shown in FIG. 1, a resistance R is connected in series to a critical temperature thermistor element $R_s$, and a capacitor C is connected in parallel to the element is used, this oscillation circuit produces an oscillation of a waveform which is nearly that of a saw-tooth waveform. However, in this case also, the oscillation frequency is of an order which is almost the same as that mentioned above.

It appears that the temperature rise operation of a critical temperature thermistor element at the time of oscillation, in the case of its use in the aforementioned circuit, is related to the construction of the bead form element, and in order to eliminate the above described disadvantages, it is necessary to restudy the construction of a critical temperature thermistor.

Figure 4:
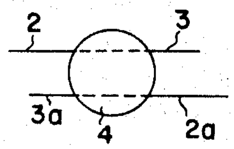
FIG. 4 is a simplified diagram indicating the construction of a conventional thermistor element.

In fabricating a critical temperature thermistor of bead form, the conventional practice has heretofore resorted to the same production method as that employed for ordinary thermistors. That is, the method has comprised stretching two parallel lengths of platinum wire or palladium wire, applying several beads of critical temperature thermistor powder in paste form between and straddling the two wires with suitable spacing between the beads, sintering the beads, and then cutting the wires between the beads. The resulting construction in ordinary cases has been such that, as shown in FIG. 4, two lead wires 2 and 2$_a$ constituting electrodes are disposed in nearly parallel relationship, and the cut-off ends 3 and 3$_a$ of the lead wires are extending out from the bead 4.

According to the present invention, the construction of the critical temperature thermistor element, differing from that described above, is such that the ends of both or the end of one of the two lead wires is contained within the bead, or the lead wires are caused to cross with the lead wires in respectively different planes, so as to cause the electric field within the bead interior to become densely concentrated. It has been found that this construction makes possible high-frequency oscillating or switching. Specific details of the thermistor element will be more clearly apparent from the following description of examples of construction according to the invention with reference to the drawings.

Referring to FIGS. 5(*a*), (*b*) and (*c*) showing examples of critical temperature thermistor elements embodying the invention, FIG. 5(*a*) shows a construction wherein the ends of two lead wires 2 and $\mathbf{2_a}$ lying on one straight line are contained within a bead 4. FIG. 5(*b*) illustrates the case wherein two lead wires 2 and $\mathbf{2_a}$ are in parallel relationship with their ends contained within the bead. FIG. 5(*c*) illustrates the case wherein two lead wires 2 and $\mathbf{2_a}$ mutually cross, the end 3 of one of the lead wires being exposed outside of the bead, and the end of the other lead wire being contained within the bead.

Figure 6A:
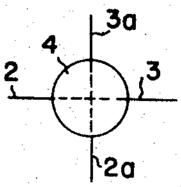
Figure 6B:
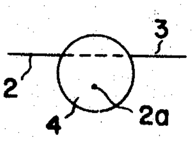
Figure 7A:
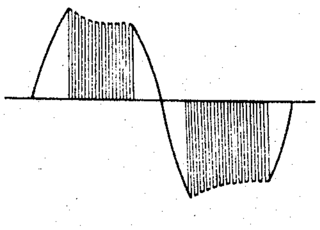
Figure 7B:
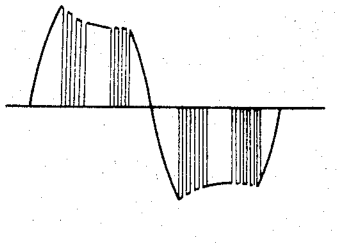
Figure 7C:
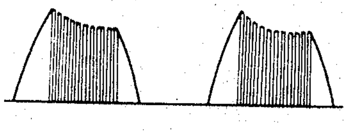
Figure 7D:
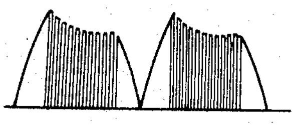

Referring to FIGS. 6(*a*) and (*b*), there is shown therein a construction wherein two lead wires 2 and $\mathbf{2_a}$ cross in respectively different planes within a bead 4 with their ends 3 and $\mathbf{3_a}$ exposed outside of the bead 4.

When critical temperature thermistor elements of bead form of the above described construction were used in the circuit shown in FIG. 1, wherein a capacitor C of 30 micro-micro-farads was used, and oscillation was caused with an A.-C. bias of 50 c./s., high-frequency oscillation wave-forms as respectively indicated in FIG. 7 were obtained. The frequencies obtained ranged from 10 to 1,000 kc./s., which are remarkably higher than those of from 0.01 to 10 c./s. attainable by conventional thermistors.

From the results obtained with respect to the above described examples, this phenomenon was analyzed, whereupon the following explanation thereof appears to be reasonable. In the case of a conventional construction of a thermistor element (FIG. 4), since the electrical field between parallel wires is uniform, the entire critical temperature thermistor is heated. In contrast, by the construction as exemplified by the embodiments of the invention shown in FIGS. 5 and 6, since the electrical field is in a densely concentrated form, a local temperature rise is caused by the initial current, and the conductivity of the locally heated part increases. Furthermore, since a critical temperature thermistor has the characteristic of an abrupt change in resistance due to temperature, the local heating becomes even more extreme, and the current path becomes concentrated in an extremely small spot, probably of a diameter of 1 micron or smaller.

This oscillation phenomenon within an oxide semiconductor or a sulfide semiconductor is unpercedented, and it may be said that the high-frequency oscillation phenomenon due to the construction illustrated in FIGS. 5 and 6 is a highly important discovery and development.

As described above, the oscillation produced through the use of a conventional thermistor has been limited to very low frequencies in the range of from 0.01 to 10 c./s., the present invention affords oscillation frequencies of from 10 to 1,000 kc./s., which are remarkably higher. Accordingly, the invention makes posible intermittent oscillation operation due to A–C bias.

In another aspect of the present invention, it provides a new oscillator wherein, to a critical temperature thermistor having the characteristic of its resistance value varying abruptly in a certain specified temperature range and the characteristic whereby the electric field concentrates in one part thereof at the time of operation, there are connected a capacitor in parallel connection and a resistance in series connection, and bias is provided by alternating current or pulsating current. This oscillator has the following advantages.

In the case indicated in FIG. 7(*a*), oscillation does not occur at the time when the input voltage is low, and when the input voltage rises to a certain value, the thermistor is locally heated and causes oscillation as described hereinabove. When the voltage decreases, the oscillation again stops. Consequently, two oscillation bands (positive and negative) are formed for each cycle.

Furthermore, by varying the voltage applied to the element 1 or the characteristic of the element, the overheated state of the element can be caused to occur at the maximum point of the above mentioned voltage, whereby two oscillation bands can be created in one half cycle as indicated in FIG. 7(*b*).

In addition, by utilizing pulsating currents resulting from half-wave or full-wave rectification as indicated in FIGS. 7(*c*) and 7(*d*), it is possible to create various oscillation bands. By utilizing this possibility (for example, by cutting the D–C component or the low frequency component by means of a capacitor $C_1$ as shown in FIG. 8) the oscillator can be adapted to constitute a pulse generator or a signal injector.

Furthermore, since the element is of the thermal type, that is, of a type whose oscillation is controlled by the outside temperature, it can be used as a detector (sensor) of various devices such as a temperature gauge or an air velocity gauge.

Still another advantage of the oscillator of the invention is that it can be extremely miniaturized (for example, 3-mm. diameter x 12 mm.) in comparison with devices such as other pulse oscillators in which vacuum tubes, transistors, and the like are used. Moreover, this oscillator can be produced to sell at a low price.

In another aspect of the present invention, it provides a compact construction and assembly of an oscillator in a practical form based on the fundamental arrangement as described above, wherein there are provided at least a critical temperature thermistor, a capacitor connected in parallel thereto, and a resistor connected in series thereto.

The details of this construction will be apparent from the following description with respect to two examples.

*Example 1*

Figure 2:
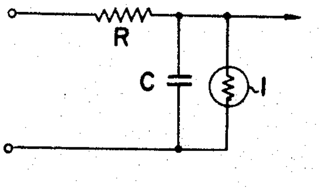

FIG. 9 shows an example of reduction of the fundamental circuit shown in FIG. 2 to a practical device form according to the invention. The core part consists of a resistor R having an insulated surface as in, for example, a molded type resistor. About the outer longitudinal surface of the resistor R, there is formed a first conductive layer 5, about which a dielectric layer 6 and then a second conductive layer 7 are successively formed in laminar arrangement, the layer 7 being of cup shape.

One end of the resistor R is connected electrically to the bottom of the cup-shaped, second conductive layer 7. A critical temperature thermistor 1 is connected between the first and second conductive layers 5 and 7. The other end of the resistor R and the first conductive layer 5 are respectively provided with lead wires 8 and $\mathbf{8_a}$ for bias input connected thereto.

In the device arranged and constructed in this manner, a capacitor of a capacitance of the order of 10 to 100 pf. is formed, in effect, between the first and second conductive layers 5 and 7, this capacitor functioning equivalently as the capacitor C in the circuit of FIG. 2. Accordingly, this device can be manufactured at low cost and in very miniature sizes (approximately 2.5 mm. diameter x 12 mm.).

By this construction, moreover, since the output is derived directly from the critical temperature thermistor, the device is suitable for use in cases where it is desired to obtain an output containing a low frequency or a D-C component.

*Example 2*

An example of the circuit shown in FIG. 8, excluding the input signal source S, reduced to a practical device form according to the invention is shown in FIG. 10. The principal parts of this device are essentially the same as those of the device shown in FIG. 9, but there are additionally formed a second dielectric layer $\mathbf{6_a}$ about the second conductive layer 7 indicated in FIG. 9 and a third conductive layer 11 for leading out output about the second dielectric layer $\mathbf{6_a}$.

By this construction, the second conductive layer (the output terminal in the device shown in FIG. 9) and the third conductive layer are capacitance coupled by a capacitance of, for example, approximately 100 pf. (that is, in the device shown in FIG. 10, the conductive layers 7 and 9 are disposed to confront each other with a dielectric layer 6 interposed therebetween). As a result, D-C and low-frequency components are cut, and the device is suitable for cases where only a high-frequency component is required.

In the device shown in FIG. 10, the layer 11 also is a conductor, which functions also as a high-frequency shield. In the case of this device, also, the size of the device can be made very small (approximately 3 mm. diameter x 14 mm.), and the device, moreover, can be manufactured at very low cost.

In either of the devices described above, since the device is of extreme miniature size, it is advantageous in that it can be used, for example, as an integral part of a tester rod or in combination therewith (as a signal injector, pulse generator, or the like).

It will be apparent from the foregoing disclosure that, by the construction of the critical temperature thermistor developed by the present invention whereby the electric field is concentrated, a high-frequency oscillation of the order of from 10 to 1,000 kc./s. is obtainable. As a result of experimental research, we have found further that this oscillation phenomenon gives rise to a resultant phenomenon whereby a very low current pulse is generated between the lead wires within the device, and that this phenomenon is exactly the same as the discharge phenomenon causing high-speed switching through the utilization of the discharge phenomenon within the solid structure of a semiconductor.

In still another aspect of the invention, this phenomenon can be utilized in many applications as exemplified by its application to a counter circuit described hereinbelow.

In this application, an oxide semiconductor whose electrical resistance varies abruptly is fabricated in a form for concentration of electric field and used as a switching element, the discharge phenomenon within the solid structure of this semiconductor in the abrupt variation region of its resistance being utilized to cause high-speed switching operation. By combining this device with, for example, a plurality of flip-flop circuits, it is possible to provide a semiconductor dekatron. The nature and details of such applications will be more clearly apparent from the following examples of embodiment of the invention.

*Example 3*

The construction of a thermistor element constructed particularly for use in a semiconductor dekatron is shown in FIG. 11. As shown, in an oxide semiconductor 4 exhibiting abrupt variation in electrical resistance, there are imbedded the ends of a platinum lead wire 12 to constitute the anode on one side and a plurality of platinum lead wires 13, 14, and 15 to constitute the cathode on the other side, said ends being overlapped in respectviely different planes in an arrangement for concentration of the electric field. A switching element is thereby formed.

As shown in FIG. 12, this element shown in FIG. 11 is used in a flip-flop circuit, wherein the lead wire 12 is connected by way of a variable resistance $R_1$ to an output terminal, and the lead wires 13, 14, and 15 are connected by way of respective resistances $R_2$, $R_3$, and $R_4$, connected in series thereto, to a common junction. The lead 13 is connected by way of a capacitor $C_2$ to the lead 15, and the lead 14 is connected by way of a capacitor $C_3$ and a resistance to the said output terminal.

The current-voltage characteristic of the above mentioned thermistor element is graphically indicated in FIG. 13. In this graph, *a–b–d* represents the characteristic curve of only the semiconductor; *e–f* represents the characteristic curve of only the series-connected resistances; and *a–b–c* represents the characteristic curve resulting from the combination of the two first stated characteristics.

As is apparent from this graph, when the voltage point *b* is passed, the characteristic approaches that of a full negative resistance, and the product of current and voltage becomes almost constant.

This example device operates in the following manner. Referring again to FIG. 12, the resistances $R_2$, $R_3$, and $R_4$ are selected to be of equal value, and $+E_b$ is applied. Then, when the variable resistance $R_1$ is gradually reduced in resistance value, a current flows either between the element electrodes 12–13 or between the electrodes 12–15. That is, as represented in FIG. 13, the voltage peak is passed.

If, as a supposition, a current (for example, 10 ma.) is assumed to flow between the electrodes 12 and 13, stabilization will be established at the point *c* in FIG. 13, and the currents flowing between the electrodes 12 and 14 and between the electrodes 12 and 15 at this time will be very small and will be in a stable state at point *a* in FIG. 13.

If, at this time, the pulse switch designated by the reference character SW is closed instantaneously, the charged voltage in the capacitor $C_3$ will be discharged through the resistance $R_3$. However, since the voltage direction of this discharge is such as to cause the potential of the lead 14 to be lower than that of the lead 13, the current between the leads 12 and 13 tends to shift to a current between the leads 12 and 14. However, since the capacitor $C_2$ is inserted between the leads 13 and 15, and the potential of the lead 15 is lower than that of the lead 14, the current between the leads 12 and 13 flows instantaneously between the leads 12 and 14 and switches to become a current between the leads 12 and 15, whereby it stabilizes at the point *c* in FIG. 13.

On one hand, the current between the leads 12 and 13 coincides, inversely, with the point *a*. The transfer speed in this case is 1 microsecond.

Then, if the switche SW is again closed, an operation which is exactly opposite that described above will be caused to take place, and the flow of current within the current within the element will return to the initial state. A flip-flop operation is thereby carried out in this case.

*Example 4*

FIG. 14 shows an example of a counter circuit consisting of a parallel combination of a plurality of circuits each as shown in FIG. 12. That is, by combining 9 unit circuits, a decimal counter circuit as in a Dekatron can be formed.

*Example 5*

FIG. 15 illustrates an example of a known sweep oscillator. The circuit comprises a gas-filled discharge tube G, a capacitor $C_4$ for charging, a voltage dividing resistance $R_5$, and a power source E. In the operation of this oscillator, a voltage is first applied from the power source E through the resistor $R_5$ to the capacitor $C_4$. When the potential across $C_4$ reaches the breakdown potential of the gas tube G, tube G fires and discharges capacitor $C_4$, and as a result, a sawtooth wave is produced as output. This operation is repeated to produce oscillation of sweep waveform.

It has been found that a sweep waveform can be generated in exactly the same manner by connecting a critical temperature thermistor as shown in FIG. 5 or FIG. 6 according to this invention in place of the gas-filled dicharge tube G.

Since by the practice of the present invention, a semiconductor is used to constitute a switching device, as described above, the resulting device of the invention has the following advantages in comprison with a conventonal device in which a discharge tube is used.

The first advantage is that the device structure can be extremely miniaturized. The second advantage is that, in comparison with that of a conventional utilization of gas discharge phenomenon, the response is very rapid, a response time of 1 microsecond being attainable. The third advantage is that, since a solid is used, the mechanical strength of the device is high, and, moreover, the serviceable life is long. The fourth advantage is that, since the thermistor element is readily adaptable to mass production, it is possible to lower the manufacturing cost. The fifth advantage is that the electrical circuit is simple, and the operation is stable.

The present invention, furthermore, is suitably applicable to various kinds of counting devices and affords miniaturization, particularly of electronic computers, and moreover, improvement of their performance.

Since the critical temperature resistor device according to the invention is capable of producing the same oscillation as that of a conventional gas-filled discharge tube, it can be effectively applied to devices such as automatic switching devices for antennas to afford the same advantages over a conventional gas-filled discharge tube as mentioned above, that is, the advantages of miniature size, quick response, high mechanical strength, long life, and low price.

It should be understood, of course, that the foregoing disclosure relates to only particular embodiments of the invention and that it is intended to cover all changes and modifications of the examples of the invention herein chosen for the purposes of the disclosure, which do not constitute departures from the spirit and scope of the invention as set forth in the appended claims.

We claim:

1. An oscillator comprising a critical temperature thermistor having the characteristic whereby the variation of its electrical resistance with respect to temperature variation is abrupt within a specified temperature range and so adapted that at the time of its operation an electric field is densely concentrated in one part thereof, a capacitor connected in parallel to the thermistor, and a resistance connected in series to the thermistor, the oscillator so formed being operated by an alternating current or a pulsating current.

2. An oscillator comprising a critical temperature thermistor having the characteristic whereby the variation of its electrical resistance with respect to temperature variation is abrupt within a specified temperature range and so adapted that at the time of its operation an electric field is densely concentrated in one part thereof, a capacitor connected in parallel to the thermistor, a resistance connected in series to the thermistor, a combination of the aforestated parts being operated by an alternating current or a pulsating current, and a capacitor for extracting output connected to one terminal of the critical temperature thermistor.

3. An oscillator comprising at least a resistor, a first conductor layer encompassing the resistor and electrically insulated therefrom, a dielectric layer encompassing the first conductor layer, a second conductor layer encompassing the dielectric layer and connected to one of the terminals of the resistor, a critical temperature thermistor connected between the first and second conductor layers, and lead wires connected respectively to the other end of the resistor and to the first conductor layer.

4. An oscillator comprising at least a resistor, a first conductor layer encompassing the resistor and electrically insulated therefrom, a first dielectric layer encompassing the first conductor layer, a second conductor layer encompassing the first dielectric layer and connected to one of the terminals of the resistor, a critical temperature thermistor connected between the first and second conductor layers, a second dielectric layer encompassing the second conductor layer, a third conductor layer encompassing the second dielectric layer, and lead wires connected respectively to the other terminal of the resistor and to the first conductor layer.

5. An oscillator comprising: a critical temperature thermistor composed of a bead of critical temperature thermistor material having the characteristic whereby the variation of the electrical resistance thereof with respect to temperature variation is abrupt within a specified temperature range; and two electrode wires, said electrode wires being connected integrally within said bead in mutually spaced position, the extreme end part of at least one of said wires being embedded in the said bead and the tip of said extreme end part thereof being disposed at a position in the vicinity of said extension part of the other electrode wire within said bead separated from said extreme end part; a capacitor having a pair of opposing electrodes; a resistor having a pair of electrodes; a power source; means for connecting each of said pair of electrodes of said capacitor to each of said two electrode wires; means for connecting one of the electrodes of said resistor to one of said electrode wires of said thermistor; and means for connecting said power source between the other electrode of said resistor and the other electrode wire of said thermistor.

6. An oscillator comprising: a critical temperature thermistor composed of a bead of critical temperature thermistor material having the characteristic whereby the variation of its electrical resistance with respect to temperature variation is abrupt within a specific temperature range; and two electrode wires, said electrode wires being disposed at a mutually spaced position in cross-over, integrally connected in said bead at a portion including said cross-over point; a capacitor having a pair of opposing electrodes; a resistor having a pair of electrodes; a power source; means for connecting each of said pair of electrodes of said capacitor to each of said two wires of said thermistor; means for connecting one of the electrodes of said resistor to one of the two electrode wires of said thermistor; and means for connecting said power source between the other electrode of said resistor and the other electrode wire of said thermistor.

References Cited

UNITED STATES PATENTS

| | | | |
|---|---|---|---|
| 2,641,705 | 6/1953 | Hussey | 331—107 |
| 2,948,837 | 8/1960 | Postal | 331—107 X |
| 3,206,618 | 9/1965 | Kallmann. | |

ROY LAKE, *Primary Examiner.*

S. H. GRIMM, *Assistant Examiner.*